United States Patent [19]

Miyake et al.

[11] 4,366,791
[45] Jan. 4, 1983

[54] COMBINATION OF AN AIR CLEANER AND A DECELERATION COMPENSATING AIR CONTROL VALVE

[75] Inventors: Takashi Miyake; Takaaki Nomura, both of Toyota, Japan

[73] Assignee: Toyota Jidosha Kogyo Kabushiki Kaisha, Aichi, Japan

[21] Appl. No.: 166,910

[22] Filed: Jul. 8, 1980

[30] Foreign Application Priority Data

Jul. 9, 1979 [JP] Japan .............................. 54-94784[U]
Jul. 9, 1979 [JP] Japan .............................. 54-94787[U]

[51] Int. Cl.³ ............................................ F02M 23/00
[52] U.S. Cl. ..................................... 123/327; 55/510; 123/587; 123/588
[58] Field of Search ............... 123/327, 341, 587, 588; 55/213, 510, DIG. 28

[56] References Cited

U.S. PATENT DOCUMENTS

| | | | |
|---|---|---|---|
| 3,365,179 | 1/1968 | La Force | 123/587 X |
| 3,394,687 | 7/1968 | Scott | 55/510 X |
| 3,444,671 | 5/1969 | Florine | 55/510 X |
| 4,194,477 | 3/1980 | Sugiyama | 123/327 |
| 4,195,602 | 4/1980 | Yamashita et al. | 123/327 |

Primary Examiner—William A. Cuchlinski, Jr.
Attorney, Agent, or Firm—Birch, Stewart, Kolasch & Birch

[57] ABSTRACT

A combination of an air cleaner for cleaning intake air to be inhaled by an internal combustion engine and a deceleration compensating air control valve for controlling supply of secondary air to the intake manifold of the engine during engine deceleration, wherein the deceleration compensating air control valve is mounted in the clean air space provided in the air cleaner casing at the inner side of an annular filtering element mounted in the air cleaner casing, or is mounted at the outside of the air cleaner casing, so that, in both cases, the air inlet port of the deceleration compensating air control valve is directly open to the clean air space.

5 Claims, 5 Drawing Figures

COMBINATION OF AN AIR CLEANER AND A DECELERATION COMPENSATING AIR CONTROL VALVE

BACKGROUND OF THE INVENTION

The present invention relates to a device for supplying secondary air to the intake manifold of an internal combustion engine during deceleration of the engine so as to compensate for the temporary reduction of air/fuel ratio during deceleration of the engine, and, more particularly to an arrangement of a deceleration compensating air control valve for controlling such a secondary air supply relative to the intake air cleaner for the engine.

It is already known and practiced to incorporate in the intake system of an internal combustion engine for an automotive vehicle a deceleration compensating air supply system which supplies secondary air into the intake manifold of the engine during its deceleration, in order to compensate for the temporary reduction of air/fuel ratio of the intake fuel-air mixture which occurs during deceleration of the engine. Such a system generally includes a vacuum-controlled valve having a diaphragm means adapted to be operated by intake manifold vacuum and a valve structure which opens a secondary air control port provided in a secondary air supply passage leading to the intake manifold of the engine when the intake manifold vacuum supplied to the diaphragm means increases beyond a predetermined value.

Conventionally, such a control valve has been mounted on the outside wall of the engine, and has been equipped with its own air filtering means. This conventional structure has the disadvantages in that it requires a relatively large space adjacent to the engine for mounting not only the deceleration compensating air control valve itself but also the air filtering means for the valve which is generally bulky, and that the air filtering means requires periodical cleaning, thereby adding an item of maintenance required. Further, such a deceleration compensating air supply system having its own air filtering means generates a suction noise when air is inhaled therethrough, and increases the total noise level of the engine.

SUMMARY OF THE INVENTION

It is therefore the principal object of the present invention to eliminate the above-mentioned disadvantages in the conventional deceleration compensating air supply system and to provide a new arrangement for the deceleration compensating air supply system which has overcome the above-mentioned disadvantages and is further improved with regard to structural simplicity and cost of manufacture and assembly.

According to the present invention, this object is accomplished by combining a deceleration compensating air control valve which supplies deceleration compensating air to the intake air manifold of an engine during engine deceleration with an air cleaner for cleaning intake air to be inhaled by the engine, said deceleration compensating air control valve comprising an air inlet port, an air outlet port, a valve element which controls connection between said air inlet port and said air outlet port, and a diaphragm means which has a vacuum inlet port and operates said valve element in accordance with manifold vacuum supplied to said vacuum inlet port, said air cleaner comprising a pan-like casing having an air inlet port which opens at an outer peripheral portion thereof and an air outlet port which opens at a central portion thereof, and an annular filtering element mounted in said casing so as to define an outside inlet air space connected with said air inlet port of the casing and an inside clean air space connected with said air outlet port of the casing, wherein the air inlet port of the deceleration compensating air control valve is directly open to said clean air space of said air cleaner.

In connection with the structure that the air inlet port of the deceleration compensating air control valve opens directly to the clean air space of the air cleaner, it is another object of the present invention to mount, in the combination of an air cleaner and a deceleration compensating air control valve as mentioned above, the deceleration compensating air control valve as a whole in said clean air space of the air cleaner casing.

However, as an alternative possibility, it is still another object of the present invention to mount, in the combination of an air cleaner and a deceleration compensating air control valve as mentioned above, the deceleration compensating air control valve at the outside of the air cleaner casing in such a manner that the air inlet port of the deceleration compensating air control valve is directly open to the clean air space of the air cleaner through a hole formed in the wall of the air cleaner casing in the area of said clean air space.

In connection with the concept of mounting the deceleration compensating air control valve in the clean air space of the air cleaner, it is still another object of the present invention to mount, in the combination of an air cleaner and a deceleration compensating air control valve as mentioned above, a hot compensating air control valve for controlling supply of hot compensating air to the intake manifold of an engine in accordance with temperature rise of the intake air, also in the clean air space of the air cleaner, said hot compensating air control valve having an air inlet port, an air outlet port, a valve element which controls connection between said air inlet port and said air outlet port, and a thermosensitive actuator such as a thermowax element which operates the valve element in accordance with temperature of the intake air. This hot compensating air control valve would cause, like the deceleration compensating air control valve, the problem of disadvantages pointed out with regard to the deceleration compensating air control valve if it were mounted onto the outside of the engine casing.

In connection with the mounting of the deceleration compensating air control valve and the hot compensating air control valve in the clean air space of the air cleaner, it is a further object of the present invention to position these two control valves, when the engine which is supplied with intake air from the air cleaner has a plurality of cylinders arranged in line, to be substantially symmetrical to one another with respect to a phantom plane which includes the axis of the air outlet port of the air cleaner casing and extends perpendicularly to the direction of alignment of said cylinders, in order to obtain uniform distribution of fuel-air mixture to the plurality of cylinders by making the influence of the two valve bodies as obstacles to the flow of intake air flowing through the air cleaner be symmetrized with respect to the plurality of cylinders.

BRIEF DESCRIPTION OF THE DRAWINGS

The present invention will become more fully understood from the following description of some preferred embodiments thereof, which are to be taken in conjunction with the accompanying drawings. It should be clearly understood, however, that the description of the embodiments, and the drawings, are all of them provided purely for the purpose of illustration and exemplification only, and are in no way taken as limitative of the scope of the present invention. In the drawing.

DESCRIPTION OF THE PREFERRED EMBODIMENTS

Figure 1:
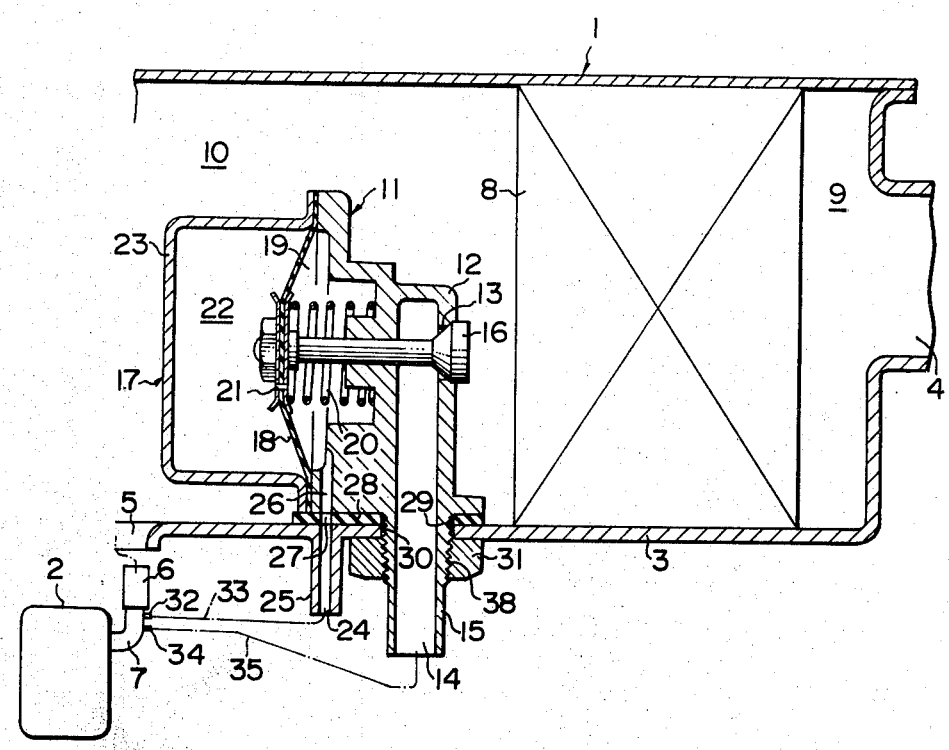
FIG. 1 is vertical sectional view of an embodiment of the combination of an air cleaner and a deceleration compensating air control valve according to the present invention.

Referring first to FIG. 1, 1 designates an air cleaner for cleaning intake air to be inhaled by an internal combustion engine diagrammatically shown in FIG. 1 as a block designated by reference numeral 2. The air cleaner 1 has a pan-like casing 3 having an air inlet port 4 which opens at an outer peripheral portion thereof and an air outlet port 5 which opens at a central portion thereof. The outlet port 5 is connected to the intake system of the engine 2, which includes a carburetor 6 and an intake manifold 7.

In the air cleaner casing 3, there is mounted an annular filtering element 8 in a manner to define an outside inlet air space 9 connected with the air inlet port 4 and an inside clean air space 10 connected with the air outlet port 5.

Further, in the air cleaner casing 3, particularly in the clean air space 10, there is mounted a deceleration compensating air control valve 11 which controls supply of deceleration compensating air to the intake manifold of the engine during deceleration of the engine, so as to compensate for temporary reduction of air/fuel ratio, or temporary becoming over rich of fuel-air mixture, caused by excessive drawing of fuel from the fuel delivery nozzle mounted in the carburetor 6 due to temporary increase of intake vacuum during deceleration of the engine.

The deceleration compensating air control valve 11 has a valve housing 12 having an air inlet port 13, an air outlet port 14 which is incorporated in a nozzle projection 15 extending from the valve body 12, a valve element 16 which controls connection between the air inlet port 13 and the air outlet port 14, and a diaphragm means 17 which has a diaphragm 18 connected with the valve element 16 and defining a diaphragm chamber 19 and operates the valve element in accordance with manifold vacuum supplied to the diaphragm chamber 19. The diaphragm 18 is biased leftward in the figure by a compression coil spring 20. The diaphragm 18 is formed with a throttle opening 21, through which the diaphragm chamber 19 is connected with a chamber 22 defined by a cover member 23 on the other side of the diaphragm 18 opposite to the diaphragm chamber 19. The diaphragm chamber 19 is connected with a vacuum inlet port 24 incorporated in a nozzle projection 25 extending from the air cleaner casing 3 by way of a passage 26 formed in the valve housing 12 and a corresponding opening 27 formed in a gasket 28 mounted between the valve housing 12 and the air cleaner casing 3. The gasket 28 is also formed with an opening 29 through which the nozzle projection 15 is passed.

The air cleaner casing 3 is formed with a hole 30 through which the nozzle projection 15 is passed, and the valve housing 12 is clamped to the air cleaner housing 3 by a nut 31 which is clamped to a threaded portion 32 provided at a root portion of the nozzle projection 15. When the valve housing 12 is clamped to the air cleaner housing 3 by the engagement of the threaded portion 38 of the nozzle projection 15 and the nut 31 under an elastic compression of the gasket 28, the vacuum passage 26 is air-tightly connected with the vacuum port 24. The vacuum port 24 is in turn connected with a vacuum take out port 32 provided at the manifold 7 via a passage 33 diagrammatically shown by a dot-dash line. On the other hand, the air outlet port 14 is connected with a secondary air supply port 34 provided at the intake manifold 7 via a passage 35 also diagrammatically shown by a dot-dash line.

When the engine 2 is operating substantially at a constant rate, the manifold vacuum transmitted to the diaphragm chamber 19 is also transmitted to the balancing chamber 22 through the orifice passage 21. In this case, the valve element 16 is driven leftward in the figure by the compression coil spring 20, so as to close the air inlet port 13 which operates as a valve port whose opening is controlled by the valve element 13. In this operating condition, no secondary or deceleration compensating air is supplied to the intake manifold of the engine.

By contrast, when the intake manifold of the engine 2 abruptly increases beyond a predetermined value due to abrupt deceleration of the engine, the change of intake vacuum is promptly transmitted to the diaphragm chamber 19, whereas the transmittance of the change of vacuum to the balancing chamber 22 is much delayed by the throttling opening 21. Therefore, if the abrupt increase of the intake vacuum due to deceleration of the engine is greater than a predetermined value, immediately after the initiation of deceleration the diaphragm 18 is biased rightward in the figure so as to remove the valve element 16 from the air inlet port 13, thereby allowing the clean air existing in the clean air space 10 of the air cleaner to be drawn through the air inlet port 13, the air outlet port 14 and the passage 35 toward the intake manifold 7. In this case, by the air inlet port 13 of the deceleration compensating air control valve 11 being directly open to the clean air space 10 of the air cleaner, clean air for the deceleration compensating purpose is always available without requiring any separate or additional air filtering means for cleaning the deceleration compensating air.

Further, as will be appreciated from FIG. 1, the structure for mounting the deceleration compensating air control valve 11 to the inside of the air cleaner casing, particularly to the clean air space thereof, in which the nozzle projection 15 extending from the valve housing 12 and incorporating therein the deceleration compensating air outlet port 14 is passed through the hole 30 formed in the air cleaner casing 3 and is clamped to the casing by the nut 13 screwed onto the threaded root portion 38 of the nozzle projection, is very advantageous as the means for mounting the deceleration compensating air control valve in the air cleaner casing, and also as the means for taking out deceleration compensating air from the deceleration compensating air control valve through the wall of the air cleaner casing.

It will also be appreciated that the arrangement of the vacuum passage 26 formed in the valve housing 12 and the vacuum inlet port 24 incorporated in the nozzle projection 25 being aligned with one another in parallel to the air outlet port 14 is also simple in manufacture and assembling, and yet provides a completely satisfactory means for conducting intake vacuum to the diaphragm chamber 19 incorporated in the deceleration compensating air control valve 11 mounted in the air cleaner casing.

Figure 2:
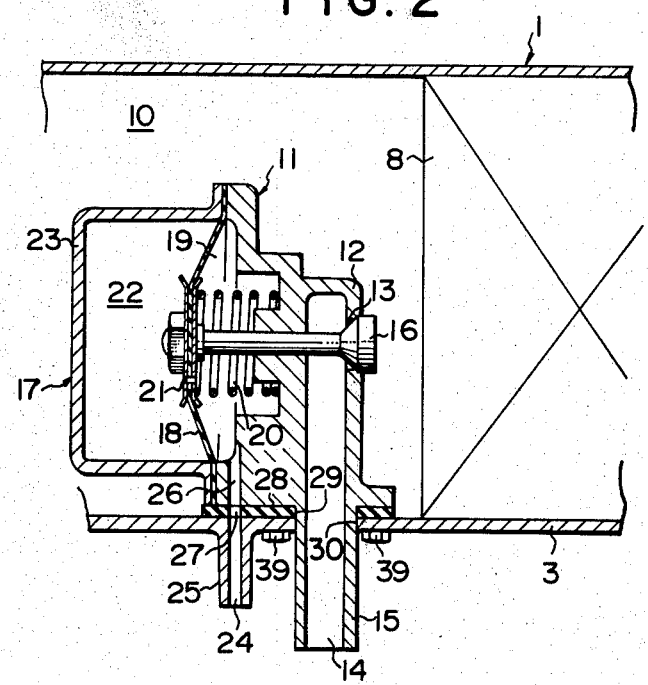
FIG. 2 is a view similar to FIG. 1, showing a slight modification of the embodiment shown in FIG. 1.

FIG. 2 is a view similar to FIG. 1, showing a small modification of the combination of an air cleaner and a deceleration compensating air control valve shown in FIG. 1. In FIG. 2 the portions corresponding to those shown in FIG. 1 are designated by the same reference numerals as in FIG. 1.

In this modification, the valve housing 12 of the deceleration compensating air control valve 11 is mounted to the air cleaner housing 3 by bolts 39 clamped into the valve housing 12 from the outside of the air cleaner casing 3 through holes (not shown) formed through the wall of the air cleaner casing 3 and the gasket 28. It will be appreciated that this structure for mounting the deceleration compensating air control valve 11 to the inside of the air cleaner casing 3 is also simple to manufacture and easy to assemble like the structure shown in FIG. 1.

Figure 3:
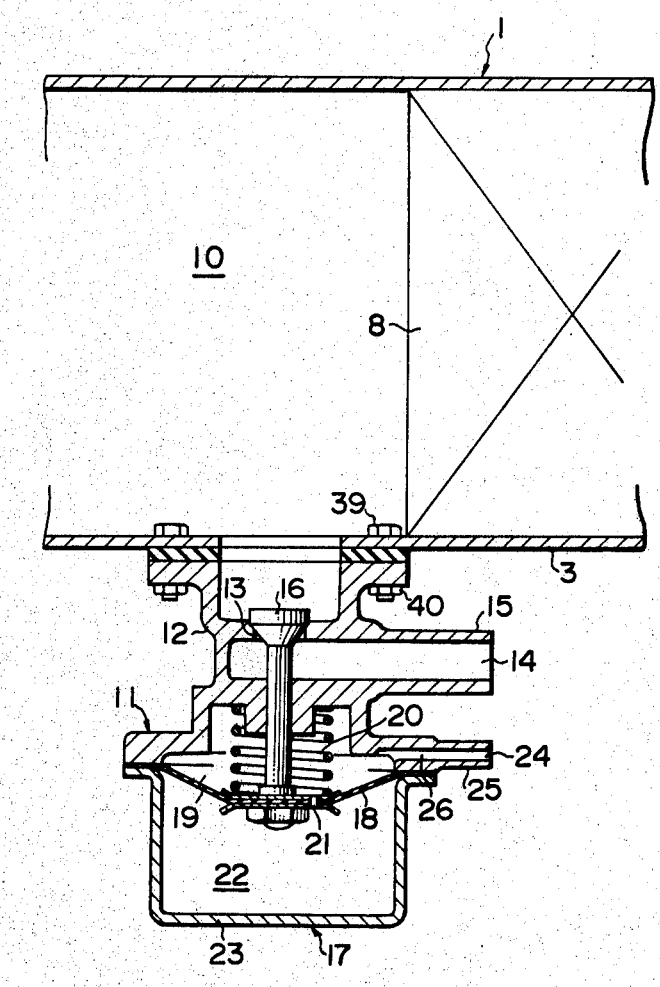
FIG. 3 is a vertical sectional view of another embodiment of the combination of an air cleaner and a deceleration compensating air control valve according to the present invention.

FIG. 3 is a view similar to FIGS. 1 and 2, showing another embodiment of the combination of an air cleaner and a deceleration compensating air control valve according to the present invention. In this embodiment, by contrast to the embodiments shown in FIGS. 1 and 2, the deceleration compensating air control valve 11 which has substantially the same structure as those shown in FIGS. 1 and 2, is combined with the air cleaner 1 so that the valve is located at the outside of the air cleaner casing 3, although the principle that the air inlet port of the deceleration compensating air control valve is directly open to the clean air space 10 of the air cleaner. In FIG. 3, the portions corresponding to those shown in FIGS. 1 and 2 are designated by the same reference numerals as in FIGS. 1 and 2. In this embodiment, the deceleration compensating air control valve 11 is mounted to the air cleaner casing 3 by several sets of bolts 39 and nuts 40.

Although the embodiment shown in FIG. 3 requires an additional space adjacent to the outside surface of the air cleaner 1 for mounting the deceleration compensating air control valve 11 as compared with the embodiment shown in FIGS. 1 and 2, if such a space is available without interfering with mounting of other auxiliaries, this embodiment has the advantages in that the valve presents no resistance to the intake air flow in the air cleaner, and that no delicate structure which penetrates the air cleaner casing wall is required for the air and vacuum connection between the deceleration compensating air control valve and the intake manifold of the engine.

Figure 4:
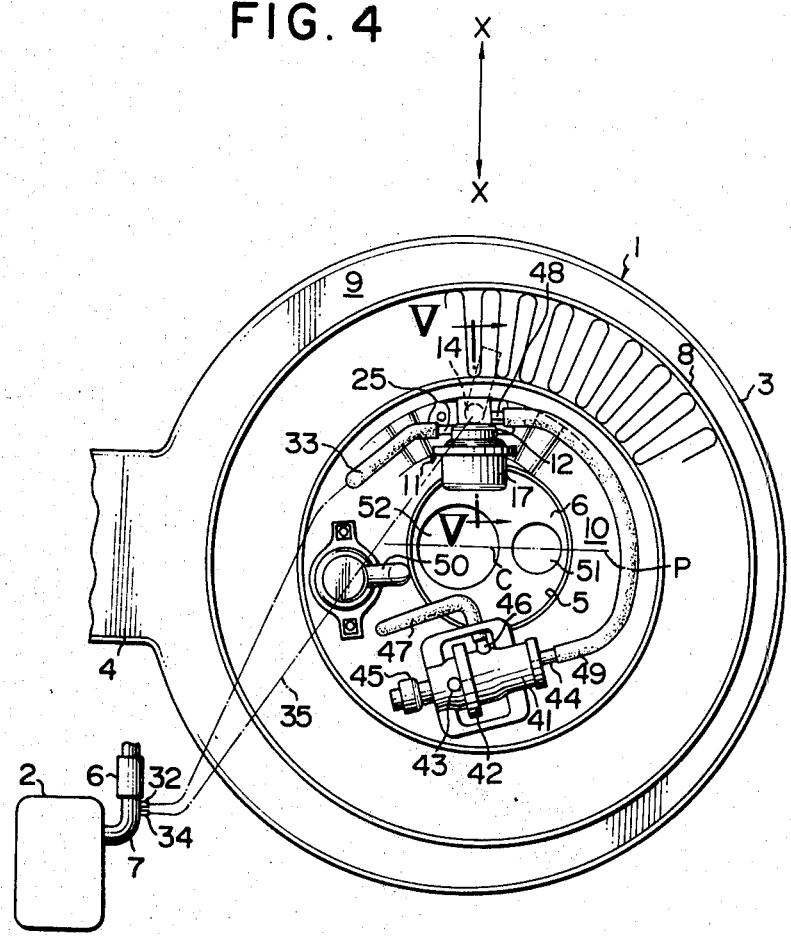
FIG. 4 is a plan view of an embodiment of the combination of an air cleaner, a deceleration compensating air control valve, and a hot compensating air control valve according to the present invention.
Figure 5:
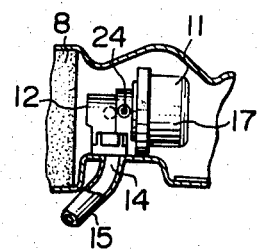
FIG. 5 is a sectional view along line V—V in FIG. 4.

FIG. 4 shows another embodiment of the present invention, in which the combination of an air cleaner and a deceleration compensating air control valve incorporates further a hot compensating air control valve which controls supply of secondary air to the intake manifold of the engine in accordance with temperature rise of intake air. In FIG. 4, which is a plan view of the combination of the air cleaner, the deceleration compensating air control valve and the hot compensating air control valve, the portions corresponding to those shown in FIGS. 1 and 2 are designated by the same reference numerals as in FIGS. 1 and 2.

In FIG. 4, the device designated by 41 is the hot compensating air control valve. This valve comprises a housing 42 incorporating therein a valve port and a valve element (both not shown) which controls connection between an air inlet port 43 and an air outlet port (not shown in the figure but incorporated in a nozzle projection 44), and a thermowax element 45 which drives said valve in accordance with the temperature of intake air so as to open said valve port when the temperature of intake air is higher than a predetermined value. A nozzle projection 46 incorporates a second air outlet port therein, which is connected with a warm air introduction control vacuum motor (not shown in the figure) by a conduit 47.

The nozzle projection 44 incorporating therein the air outlet port of the hot compensating air control valve 41 is connected with a nozzle projection 48 provided at the deceleration compensating air control valve 11 and incorporating therein a passage which connects to the air outlet port 14 of the deceleration compensating air control valve 11, via a conduit 49. Further, 50 designates a blow-by gas discharge port which itself is well known in the art.

In the embodiment shown in FIG. 4, the carburetor 6 is of the type having a primary bore 51 and a secondaary bore 52 as observable through the air outlet port 5 of the air cleaner. Further, the engine 2 is of the type having a plurality of cylinders arranged in line along the axis X—X indicated in FIG. 4. In relation to such an in line arrangement of the cylinders in the engine, the primary and secondary bores 51 and 52 of the carburetor 6 are arranged along a phantom plane P which includes the central axis C of the air outlet port 5 of the air cleaner and extends at right angle to the line X—X of the arrangement of the cylinders of the engine. Further, the deceleration compensating air control valve 11 and the hot compensating air control 41, which generally have approximately the same size as one another, are arranged to be substantially symmetrical to one another with respect to the phantom plane P, so that the interference caused by the deceleration compensating air control valve 11 and the hot compensating air control valve 41 to the flow of intake air flowing towards and through the air outlet port 5 affects equally to all the cylinders without causing any undesirable unequal distribution of fuel-air mixture to those cylinders.

In order to make the interference caused by these control valves to the flow of intake air flowing toward and through the air outlet port 5 equally born by all the cylinders, as an alternative arrangement, the control valves 11 and 41 may be arranged as being centered in the phantom plane P, although such an arrangement is not shown in the drawings, but it will be readily imagined by turning the assembly of the control valve 11 and 41 in FIG. 4 by 90 degree around the center line C of the air outlet port 5, while keeping the positions of the primary and secondary bores 51 and 52 unchanged.

Further, it will also be appreciated that the structure of the embodiments shown in FIGS. 1, 2 and 4 have still another advantage in that the noise which will be generated by the air being drawn through the air inlet ports of the deceleration compensating air control valve and the hot compensating air control valve is effectively muffled by the air cleaner casing.

Although the present invention has been shown and described with respect to some preferred embodiments thereof, and in language more or less specific with regard to structural features thereof, and with reference to the illustrative drawings, it should be understood that various changes, modifications, and omissions of the form and the detail thereof could be made by a person skilled in the art, without departing from the essential scope of the invention.

We claim:

1. A combination of an air cleaner for cleaning intake air to be inhaled by an internal combustion engine having an intake manifold, said air cleaner comprising a pan-like casing having an an air inlet port which opens at an outer peripheral portion thereof and an air outlet port which opens at a central portion thereof, and an annular filtering element mounted in said casing so as to define an outside inlet air space connected with said air inlet port and an inside clean air space connected with said air outlet port, and a deceleration compensating air control valve for controlling supply of deceleration compensating air to the intake manifold of the engine during engine deceleration, said deceleration compensating air control valve comprising a deceleration compensating air inlet port, a deceleration compensating air outlet port, a deceleration compensating air control valve element which control connection between said deceleration compensating air inlet port and said deceleration compensating air outlet port, and a diaphragm means which has a vacuum inlet port and operates said valve element in accordance with manifold vacuum supplied to said vacuum inlet port, and a hot compensating air control valve for controlling supply of hot compensating air to the intake manifold of the engine in accordance with temperature rise of engine intake air, said hot compensating air control valve comprising a hot compensating air inlet port, a hot compensating air outlet port, a hot compensating air control valve element which controls connection between said hot compensating air inlet port and said hot compensating air outlet port, and a thermosensitive acutator which operates said hot compensating air control valve element in accordance with temperature of engine intake air, wherein said deceleration compensating air control valve and said hot compensating air control valve are respectively mounted as a whole in said clean air space in said air cleaner casing, with said deceleration compensating air inlet port thereof and said hot compensating air inlet port thereof being directly open to said clean air space, and said air cleaner casing has an air conduction hole which opens through its wall in the area of said clean air space and is connected with said deceleration compensating air outlet port of said deceleration compensating air control valve, while said hot compensating air outlet port of said hot compensating air control valve is connected with said deceleration compensating air outlet port of said deceleration compensating air control valve within said clean air space via a donduit.

2. A combination according to claim 1, wherein said thermosensitive actuator is a thermowax element.

3. A combination according to claim 2, wherein said thermowax element actuates said hot compensating air control valve element in accordance with the temperature of intake air to open said valve port when the temperature of intake air is higher than a predetermined value.

4. A combination according to claim 1, wherein said hot compensating air control valve includes a second air outlet port operatively connected by a conduit to a warm air introduction control vacuum motor.

5. A combination according to claim 1, wherein said deceleration compensating air control valve and said hot compensating air control valve are substantially symmetrically arranged along a line which corresponds to an in line arrangement of cylinders in said internal combustion engine.

* * * * *